G. C. READ.
RAILWAY TRAIN AIR PIPE COUPLING SYSTEM.
APPLICATION FILED JULY 5, 1911.
1,018,342.
Patented Feb. 20, 1912.
3 SHEETS—SHEET 2.
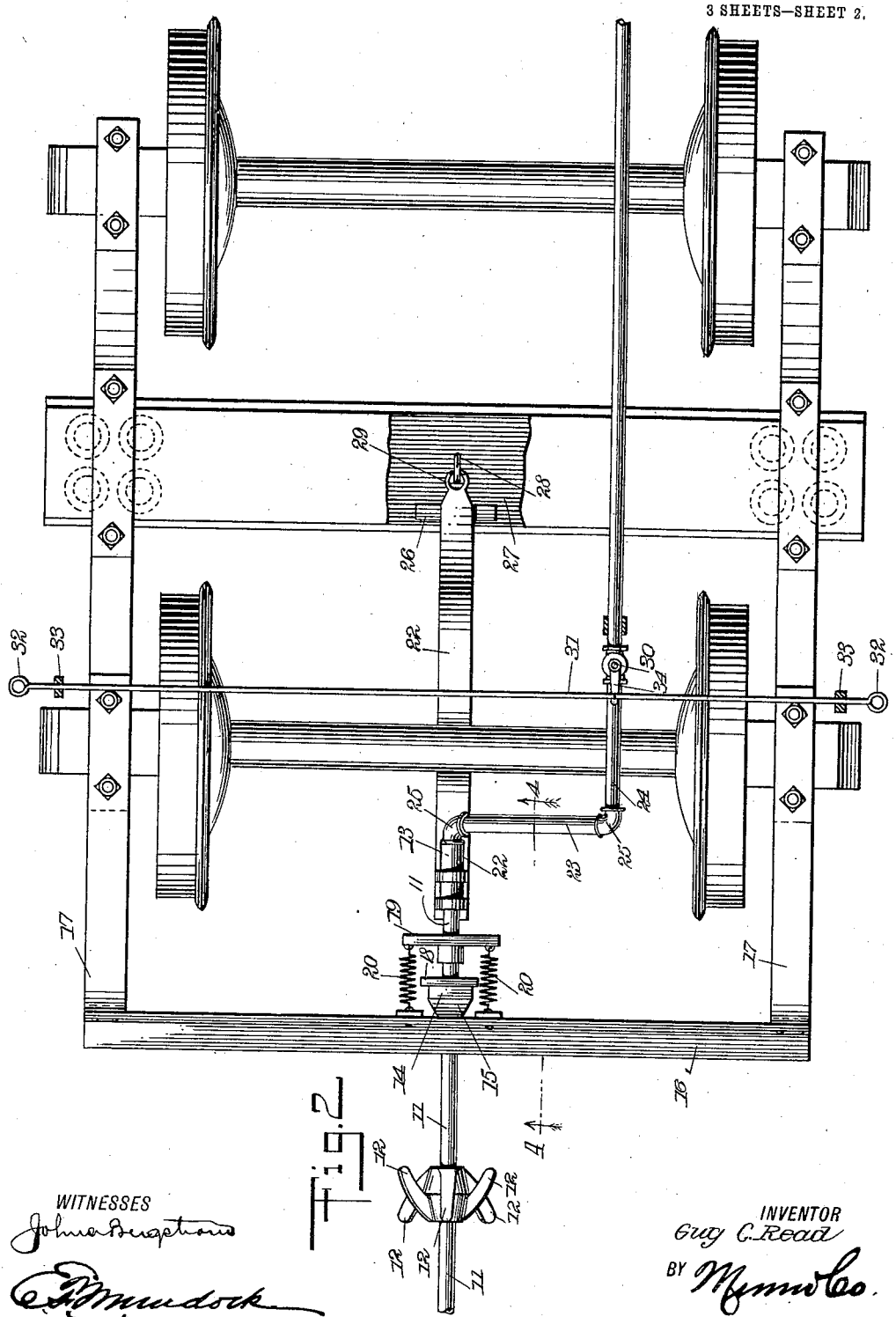

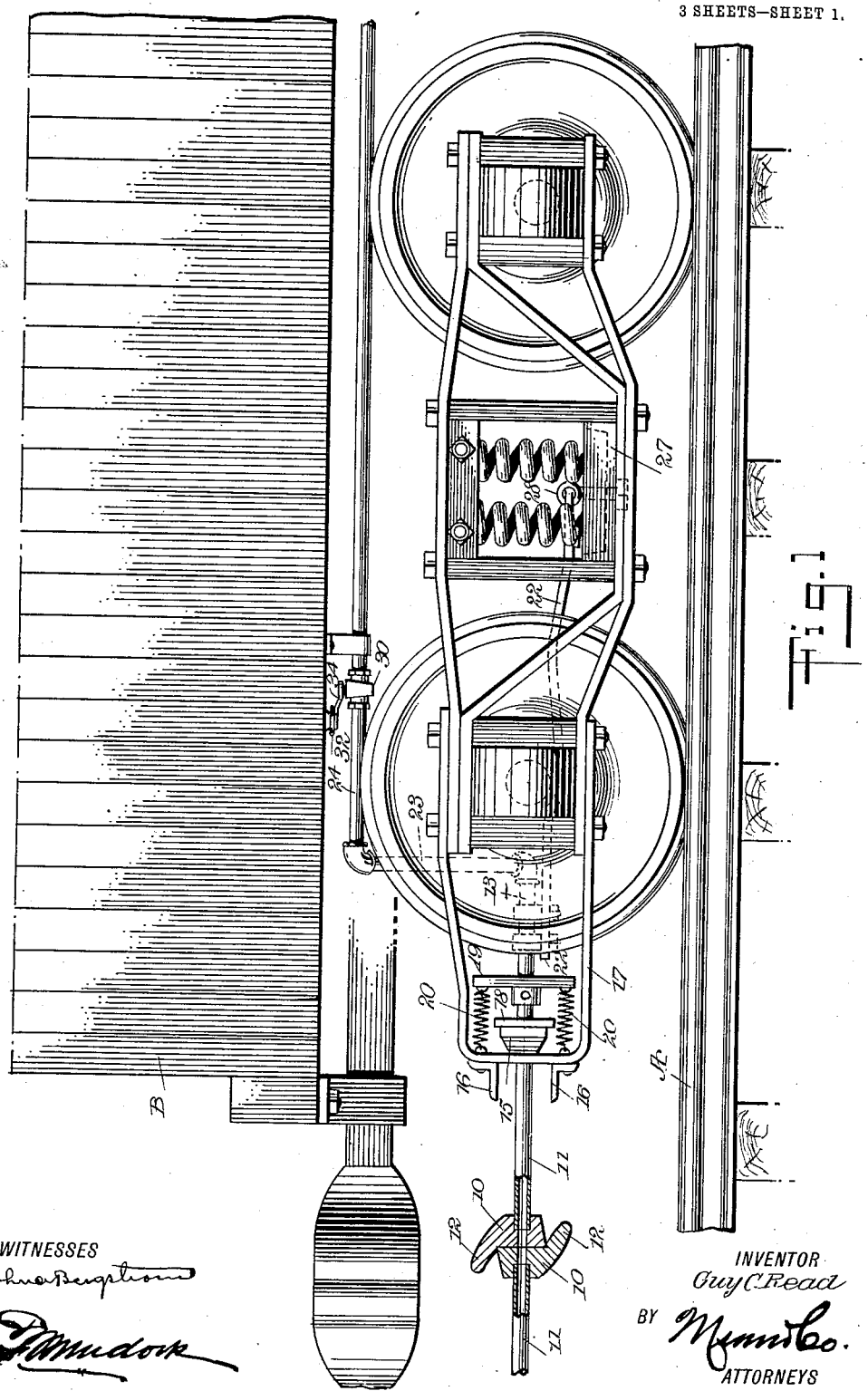

G. C. READ.
RAILWAY TRAIN AIR PIPE COUPLING SYSTEM.
APPLICATION FILED JULY 5, 1911.
1,018,342.
Patented Feb. 20, 1912.
3 SHEETS—SHEET 3.
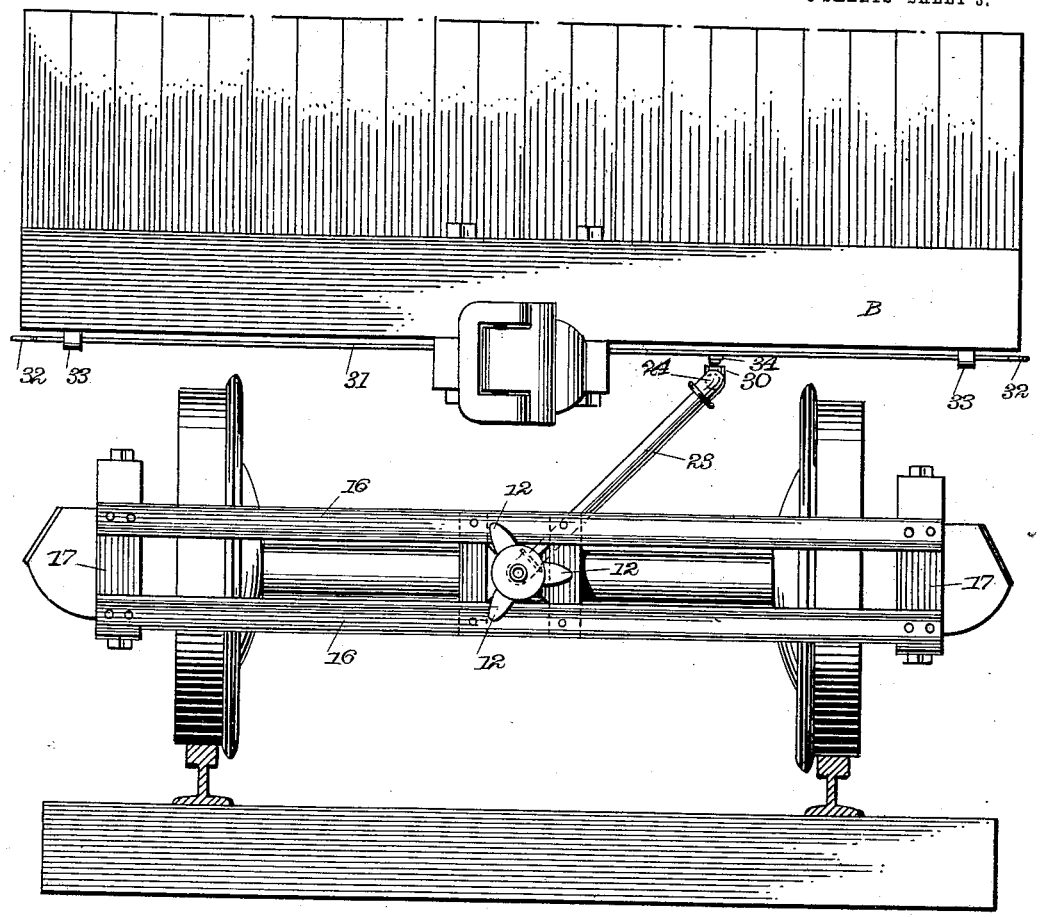
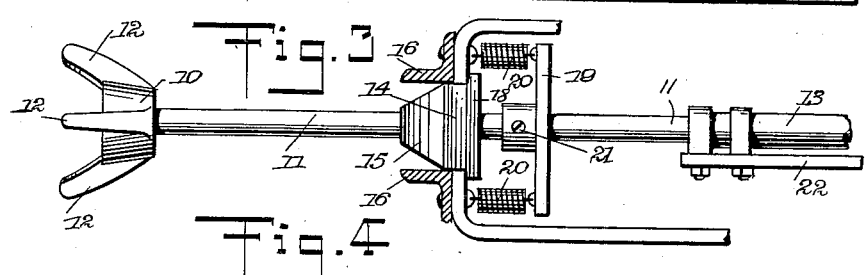
WITNESSES:
INVENTOR
Guy C. Read
BY
ATTORNEYS

UNITED STATES PATENT OFFICE.

GUY CARLETON READ, OF DAVENPORT, TORONTO, ONTARIO, CANADA.

RAILWAY-TRAIN AIR-PIPE-COUPLING SYSTEM.

1,018,342.　　　　Specification of Letters Patent.　　Patented Feb. 20, 1912.

Application filed July 5, 1911. Serial No. 636,916.

*To all whom it may concern:*

Be it known that I, GUY C. READ, a subject of the King of England, and a resident of Davenport, Toronto, in the Province of Ontario and Dominion of Canada, have invented a new and Improved Railway-Train Air-Pipe-Coupler System, of which the following is a full, clear, and exact description.

Among the principal objects which the present invention has in view are: to provide coupling devices for the air operating train service which are automatic in action; to provide couplers of the character mentioned having provision for manually operating the same; to provide couplers of the character mentioned adapted to accommodate and compensate for the movement of the car bodies independent of the coupled trucks of adjacent cars; and to provide couplers of the character mentioned with mechanism for centering or alining the coupling heads of adjacent cars.

One embodiment of the present invention is disclosed in the structure illustrated in the accompanying drawings, in which like characters of reference denote corresponding parts in all the views, and in which—

Figure 1 is a side elevation of an end fragment of a railway car provided with air pipe couplers constructed and arranged in accordance with the present invention; Fig. 2 is a plan view of one of the trucks provided for the car shown in Fig. 1, having in conjunction therewith the coupler mentioned; Fig. 3 is an end elevation of a car having mounted thereon a coupler constructed and arranged in accordance with the present invention; Fig. 4 is a detail view, in vertical section and on an enlarged scale, the section being taken on the line 4—4 in Fig. 2, showing a coupler head in an advanced position as assumed when uncoupled from an adjacent car; and Fig. 5 is a view similar to Fig. 4, showing the coupler head in its retracted position when coupled with an adjacent car.

In the construction of railway cars various devices are employed where the body of the car is lifted at various heights above the track bed while the trucks have wheels usually of the same diameter. It is therefore possible to arrange the connecting members of an air pipe service on the trucks and insure a uniformity of the lift of the coupling ends of the said pipes. It is to insure with greater certainty the elevation of the coupling member of the system that there is provided means for supporting the coupler heads and parts connected therewith on the relatively fixed or rigid structure of the truck, and upon that part of the truck least affected by the spring action.

As shown in the drawings, the coupler heads 10 are fixedly mounted upon the coupler head pipe sections 11. The heads 10 are provided with a crown face adapted to seat each upon the other to form a substantially air tight joint when forced the one upon the other. The heads 10 are each provided with a series of guide fingers 12. The fingers 12 are disposed in relatively staggered relation, and are adapted to strike the one between the others to form centering guides for each of the heads in their seating movement. The fingers 12 are radially extended, as best shown in Fig. 2 of the drawings, to provide for a lateral displacement of the heads 10 when held in the various pipe sections 11.

The pipe sections 11 are telescopically mounted in a short pivot section 13. Fixedly mounted upon each of the pipe sections 11 is a guide block having a square base 14 and a pyramidal extension 15. The base 14 is designed to rest between the bars 16. The bars 16 are extended across the trucks and mounted rigidly on the advanced frame 17. By the adjustment of the bars 16 with reference to the crown of the railway rails A the height of the pipe sections 11 and heads 10 is regulated. At the rear of the base 14 is formed a flange 18 which, when the heads 10 are forced forward as shown in Fig. 4 of the drawings, rests against the back of the bars 16 to form stops for the forward thrust of the said heads 10 and pipe sections 11. The pyramidal extensions 15 operate to guide each of the pipe sections 11 and to right the head 10 connected therewith. This will be understood when recognized that if the pipe section be slightly canted the inclined sides of the extension 15 when driven between the bars 16 will turn the block to the proper angle at which the square base 14 will seat between the said bars 16.

To normally maintain the heads 10 in an extended position there are provided the cross bars 19 and the springs 20. Each cross bar 19 is provided with a collar to receive a set screw 21 whereby the cross bar is adjusted at any convenient and suitable position upon the pipe section 11. The springs 20, as seen best in Figs. 4 and 5, normally operate to seat the base 14 of the guide blocks between the bars 16. When the guide block is seated between the bars 16 the heads 10 are extended in front of the draw bars of the car. When the draw bars of the cars are coupled the heads 10 are alined therewith, and the pipe sections 11 are retracted so that the guide block is removed from engagement with the bars 16. In this position the pipe sections 11 and heads 10 are free to sway to accommodate the movement of the car bodies and trucks.

In the retracted position of the pipe sections 11 they are supported by the sections 13. The sections 13 are each supported by a strap bar 22 and a swinging pipe section 23. The swinging pipe section 23 is pivotally connected with the pivot section 13 and with the train pipe 24 by means of an L-coupler 25. The section 23 is, as seen by comparison of Figs. 2 and 3, extended upward from the pivot section 13 in an inclined position. The train pipe 24 is hung on the body of the car B so as to yield to the slight strain imposed thereon by the car body and truck vibrating to and from each other in the train service. It is to aid in supporting the section 23 that there is provided the strap bar 22 with a foot piece 26, which piece 26 rests upon the bolster 27 in advance of the eyelet 28 with which is coupled the eyelet 29 being formed at the rear of the bar 22.

The operation of an air pipe coupler system when constructed and arranged as described is as follows: As cars to be coupled are approaching, the pipe sections 11 are extended to hold the heads 10 in advance of the draw bars and car couplers connected therewith. The heads 10 are thus initially butted, forcing backward each of the pipe sections 11, the springs 20 connected with each of the pipe sections yielding to permit the movement of the said sections. The blocks having the base 14 are thus moved from control of the bars 16, and the fingers 12 are permitted to rectify any displacement of the heads 10 to perfect the alinement of the sections 11 and the seating of the faces of the two heads 10. The joint thus formed between the faces of the heads 10 is sufficient to pneumatically seal the joint. When the air is now turned on by opening the valve 30 on the train pipe 24 the work of coupling the air pipes is completed. To operate the valve 30 there is provided a rod 31, the curled ends 32 whereof are extended beyond the bracket bearings 33 mounted upon the car body B. The crank arm 34 of the valve 30 is operatively engaged with the rod 31, as seen best in Fig. 2 of the drawings.

When it is desired to uncouple the cars the operator moves the rod 31 to close the valve 30 prior to releasing the car couplers. The pressure of the air in the pipe 24 is thus maintained. By operating the valve 30 from the side of the car and by eliminating the need for manual handling of the heads 10, it is not necessary for a person to pass between the cars.

By the expression "flexible air conductors" herein employed, is meant the pipe sections 11, the pivot sections 13, cross bar 19, the springs 20, 20, the heads 10, pipe section 23 and L-couplers 25. When the extension 15 is moved from engagement with the bars 16 and frame formed thereon, the pipe sections 11 are free to rock vertically on the pivot formed by the pipe section 23, which moves in its connection with the L-couplers 25 to permit the movement. This flexibility in the construction described permits the registration of the heads 10 when mounted on car trucks of different heights.

Having thus described my invention, what I claim as new and desire to secure by Letters Patent is:—

1. In a system of the character described, a coupling comprising a plurality of heads forming the terminals of a train pipe carried by each car, the faces of said heads being arranged to form air tight joints; a plurality of guide members radially extended and forwardly inclined to engage and guide the head being moved into engagement; resilient means operatively connected with said heads for advancing the same beyond the couplers of the draw heads of the car; supporting means fixedly connected with the carrying truck of the car for regulating the elevation of said heads; and means for supporting said heads on said trucks while the cars are disconnected to be moved from engagement with said truck when said cars are connected.

2. In a system of the character mentioned, in combination with a train pipe, of a plurality of slidably mounted terminal pipe sections; a plurality of coupler heads mounted on said pipe sections; a plurality of supporting frames connected with the car carrying trucks having an opening through which said pipe sections extend; a supporting head for each of said pipe sections having inclined sides extensible within said opening to pass said pipe sections; and yielding means for normally advancing said supporting heads within said openings.

In testimony whereof I have signed my name to this specification in the presence of two subscribing witnesses.

GUY CARLETON READ.

Witnesses:
R. L. BELL,
P. S. Y. ARNOLD.